United States Patent Office 3,356,830
Patented Dec. 5, 1967

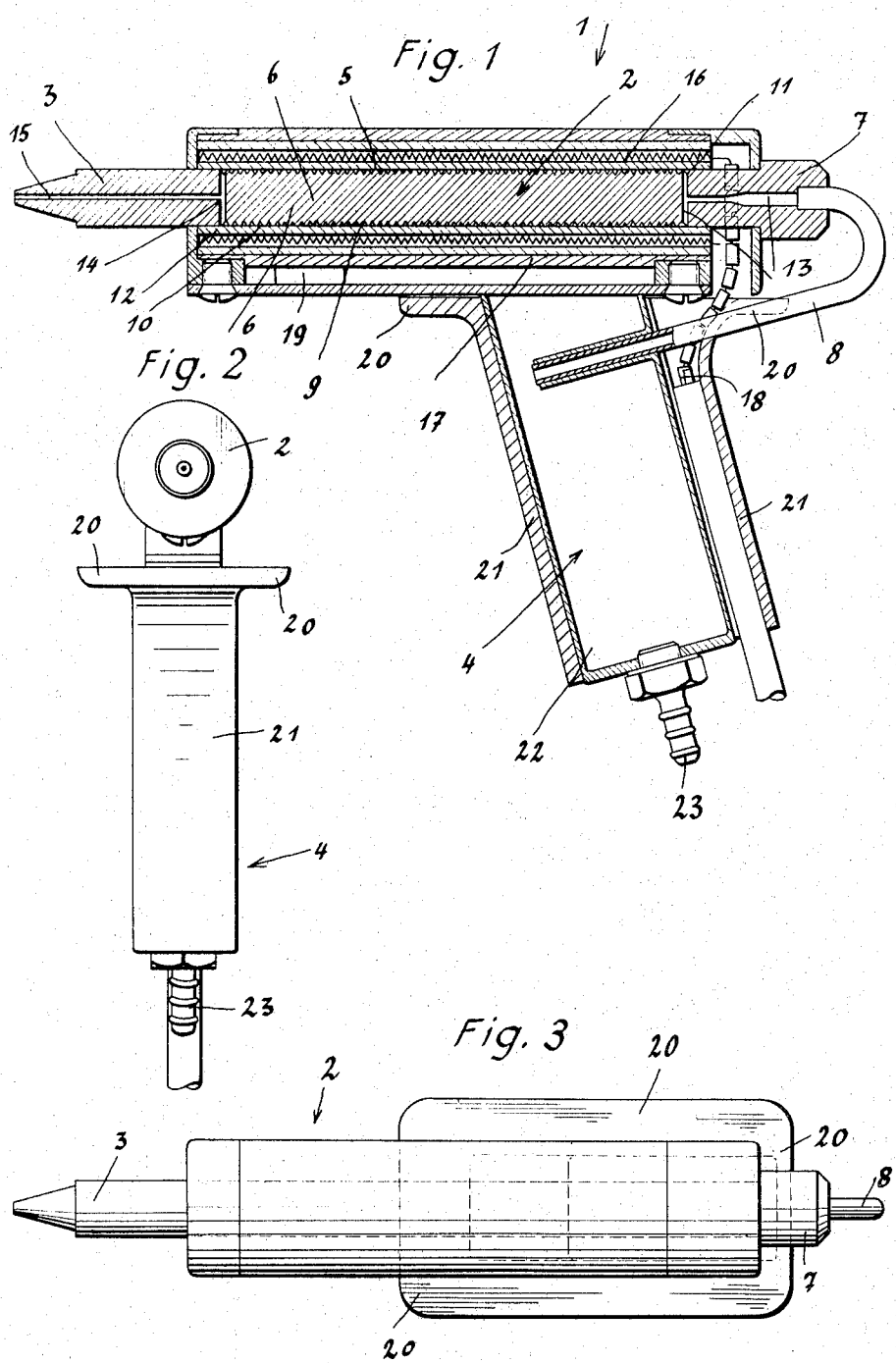

3,356,830
PROCESS AND APPARATUS FOR SOLDERING IN THE PRESENCE OF HYDROGEN GAS
Hermann Otto Schleer, Salzstrasse 7, Freiburg im Breisgau, and Kurt Bornschein, Freiburg im Breisgau, Germany; said Bornschein, assignor to said Schleer
Filed June 30, 1964, Ser. No. 379,231
Claims priority, application Germany, July 5, 1963, Sch 33,510
4 Claims. (Cl. 219—373)

The present invention relates to a process and apparatus for soldering at localized areas.

In particular, the present invention relates to a process and apparatus utilizing hydrogen gas for heating the area where the soldering is to take place.

It is already known, for example, to solder in an airtight, closed oven filled with hydrogen gas. However, with a process and apparatus of this type it is only possible to solder workpieces which together with any attachments fastened thereto are capable of withstanding the temperature prevailing in the oven. Individual contacts of temperature-sensitive switch assemblies, for example, cannot be soldered with a structure or process of this type.

Furthermore, with conventional soldering processes and apparatus it is often extremely difficult to carry out the soldering operations at relatively inaccessible locations, particularly when it is desired to prevent the heat employed in connection with the soldering operations from spreading to heat-sensitive elements in the region of the soldering area. Soldering of this later type has conventionally been carried out with electric soldering irons, but the temperature of such soldering irons is impossible to maintain constant in a highly localized region since the temperature is to a large extent influenced by the heat given up to the surrounding space by the soldering operations taking place at a localized area. The result is that either hot or cold localized soldering cannot be avoided. Cold soldered joints result from carrying out the soldering operation at a temperature which is too low so that the flux is not sufficiently vaporized and an oxide layer on the metal is not removed. The oxide layer prevents a thorough intimate contact of the parts to be soldered with the molten solder.

A hot soldered joint forms prematurely a new oxide layer on the parts of the metal surfaces which are to be joined because the flux is prematurely vaporized with a soldering iron which is too hot, and in this case also a sufficiently thorough and intimate engagement between the surfaces to be joined and the molten solder is not guaranteed.

A particular fault of cold or hot soldered joints resides in the fact that the defective joint is not immediately apparent. The exterior appearance of such joints resembles very closely that of properly soldered joints and for a short period of time fulfill the functions of properly soldered joints, with the result that faulty soldering becomes apparent only when after a relatively short period of time corrosion causes failure to take place at the improperly soldered joint. With highly sensitive measuring devices it is possible for electrical resistances to change due to such corrosion at a soldered joint to such an extent that the entire instrument becomes defective.

It is accordingly a primary object of the present invention to provide a soldering process and apparatus which will avoid the above drawbacks.

In particular, it is an object of the invention to provide a process and apparatus which make it possible to carry out proper soldering operations at localized areas of difficult accessibility.

Furthermore, it is an object of the present invention to provide a process and apparatus which make it possible to reliably maintain a relatively constant proper temperature at the soldering area so as to avoid cold or hot soldered joints.

Furthermore it is an object of the present invention to provide a process and apparatus which make is possible to direct to a localized area where soldering is to take place a hot pencil-shaped stream of hydrogen gas.

In addition it is an object of the present invention to provide a hand tool capable of accomplishing the above objects.

Furthermore it is an object of the present invention to provide a hand tool of this type which will reliably protect the hand of the operator which holds the tool from the heat used in connection with the soldering operations.

Also, it is an object of the invention to provide a hand tool of the type which can be very conveniently and easily manipulated so as to direct a stream of hot gas accurately to a selected area even if this area happened to be relatively inaccessible.

With these objects in view the invention includes, in a soldering process, the step of directing to an area where the soldering operations are to take place a hot, pencil-shaped stream of hydrogen gas.

Also, with the above objects in view the invention includes a hand tool made up of a grip adapted to be held in the hand of the operator, a gas heating means carried by and projecting forwardly beyond the grip, and a conduit means extending longitudinally along the gas heating means for conveying a gas to be heated by the gas heating means, this conduit means terminating forwardly beyond the gas heating means in a discharge nozzle through which a heated gas stream of small cross sectional area issues.

The novel features which are considered as characteristic for the invention are set forth in particular in the appended claims. The invention itself, however, both as to its construction and its method of operation, together with additional objects and advantages thereof, will be best understood from the following descriptioin of specific embodiments when read in connection with the accompanying drawings, in which:

FIG. 1 is a longitudinal sectional elevation through a possible embodiment of a hand tool according to the invention capable of carrying out the process of the invention;

FIG. 2 is an end elevation of the tool of FIG. 1 as seen from the left side of FIG. 1; and FIG. 3 is a top plan view of the tool of FIG. 1.

Referring now to the drawings, there is shown therein a hand tool 1 which includes a heating means 2 for heating a gas as well as a conduit means 3 for conducting the gas to be heated and a hand grip 4 which is connected to and positioned to the remainder of the tool 1 in such a way as to provide a pistol-type of hand tool, the grip 4 being inclined downwardly and rearwardly away from the heating means 2. With this arrangement of the components of the tool 1, this tool is particularly easy to handle and manipulate and makes it possible to very accurately direct a compact, pencil-shaped hydrogen gas stream of small cross sectional area onto a localized area which is in the nature of a point rather than any substantial area and which is the area where the soldering operations are to take place.

The conduit means 3 includes an elongated metallic solid core 6 having an intermediate elongated exteriorly threaded portion 5 and the core 6 has a pair of elongated end portions respectively extending forwardly and rearwardly beyond the intermediate threaded portion 5 thereof. The front elongated end portion of the core 6 is formed with an axial bore 15 which forms at its front end a discharge nozzle for the heated stream of hydrogen gas, as will be apparent from the description below, and the elongated rear end portion 7 of the core 6 is formed with an axial bore 13. The axial bore 13 terminates at its inner end in a transverse bore which extends across and communicates with the axial bore portion of the bore 13 and which has outer open ends situated at the right end of the threaded portion 5 and communicating with the thread thereof. The axial bore 15 terminates at its inner end in a transverse bore 14 having opposite open ends, this bore 14 communicating with the axial bore 15 and with the left end of the threads at the exteriorly threaded portion 5. The core 6 is surrounded and engaged by a sleeve 9 which has its inner surface in engagement with the crests 10 of the threads at the exterior of the portion 5 and this sleeve 9 has opposed end portions 11 and 12 extending beyond the threaded portion 5 and fluid-tightly engaging the smooth exterior surface of the core 6. In this way it will be seen that the bore 13 leads into a helical passage formed by the threads of the portion 5 and the inner surface of the sleeve 9, and this helical passage in turn leads into the bores 14 and 15 so that in this way a conduit means is provided for guiding gas through the heating means and to the discharge nozzle formed by the left open end of the bore 15. A tube 8 has one end fluid-tightly communicating with the bore 13, and this tube 8 forms part of the conduit means and serves to direct into the bore 13 the gas which is to be heated.

The sleeve 9 is surrounded by a tubular housing of the tool 1, this housing having opposed end walls through and beyond which the elongated free end portions of the core 6 extend, and the outer tubular wall of the housing surrounds and is spaced from the sleeve 9 to form therewith an annular elongated chamber in which the heating means is located. This heating means includes a plurality of elongated heating coils 16 which are electrically conductive and which extend longitudinally of and are distributed about the sleeve 9, the latter being made of a metal of good thermal conductivity, and the heating means further includes a tubular member 17 of poor thermal conductivity which surrounds and insulates to a large extent the heating coils 16, so that the heat therefrom will be directed inwardly to the core 6 and the sleeve 9. The conductive heating coils 16 communicate electrically with a conductor 18 which through a further unillustrated conductor is electrically connected with a thermostat 19 situated between the lower part of the tubular housing and the insulating tube 17, and this thermostat 19 controls the energizing and de-energizing of the coils 16 so as to control the heating of the gas which flows through the conduit means. The temperature of this gas, however, is primarily controlled by means of an unillustrated throttle valve which is located in a supply conduit for the gas and which can be adjusted to control the amount of gas which flows through the tool during a given unit of time.

Because the grip 4 is arranged in the immediate vicinity of the heating means 2, care must be taken to prevent excessive heating of the grip so that there will be no possibility of injury to the hand of the operator, and thus it is important that the grip 4 remain relatively cool at all times. In order to achieve this result it has proved to be particularly suitable to provide between the grip 4 and the heating means 2 a heat shield 20 which is of a flat substantially rectangular configuration and is of a considerable area and situated beneath the heating means in a horizontal plane when the core 6 extends horizontally, as is apparent from FIGS. 2 and 3, in particular, and in the illustrated example this shield 20 is made of a plastic of low thermal conductivity and is formed in one piece with a plastic covering layer 21 which surrounds the grip 4 and which is formed with a bore through which the conductor 18 passes from the bottom end of the grip to a suitable source of current.

In accordance with a further feature of the invention the grip 4 itself is hollow and is in the form of a container 22 the interior of which, at its portion adjacent to the heating means 2, communicates with the end of the tube 8 distant from the bore 3. The bottom end wall of the container 22 carries an axially bore conventional connector 23 adapted to be place in fluid-tight connection with one end of a flexible hose the other end of which communicates with the source of the gas to be heated, and in this case hydrogen gas is used according to the process of the invention as the gas to be heated. In this way unheated gas will flow into the container 22 in order to cool the grip 4 by extracting therefrom any heat which happens to be transmitted to the grip 4, so that the gas flowing into the container 22 and out of the latter through the conduit means which starts with the tube 8 and terminates with the discharge nozzle end of the bore 15 is on the one hand preheated by removing heat from the grip 4 and on the other hand contributes very effectively to the cooling of the grip 4 so as to further reduce any danger of rendering the grip 4 too hot to handle. Thus it will be seen that while the grip 4 is maintained very reliably at a relatively low temperature there is at the same time an extremely efficient full use of the available heat for heating the gas. Moreover, the connection of the electrical cable 18 as well as the flexible hose to the bottom end of the grip 4 contributes very greatly to the ease with which the tool can be manipulated so as to conveniently and comfortably direct the stream issuing from the bore 15 to any desired localized area. The flexible hose and flexible cable 18 do not in any way interfere with the manipulation of the tool by the operator.

During use of the structure of the invention in order to practice the process of the invention the hydrogen gas flows from a suitable container where the gas is held under pressure through the unillustrated hose into the container 22 so as to cool the grip 4. From the container 22 the hydrogen gas flows through the tube 8 and the bore 13 into the helical passage defined by the inner surface of the sleeve 9 and the threads along the exterior of the portion 5 of the core 6, and while flowing through this helical passage in particular the gas is very effectively heated to a relatively high temperature. When the gas reaches the front end of the helical passage it flows through the transverse bore 14 into the axial bore 15 of the conduit means 3 so as to discharge at the front open end of the axial bore 15 in the form of a sharp compact highly focused stream of small cross sectional area and of pencil-shaped configuration. In accordance with the electrical energy which is supplied and the amount of gas which flows through the tool in a given unit of time, the temperature of the hydrogen gas stream directed to the localized area where soldering is to take place can be adjusted to the elevation of a temperature which is suitable for the soldering operations. This temperature will as a rule range between 250 and 600° C. It is preferred to make the core 6 of copper inasmuch as this metal has a very high coefficient of thermal conductivity and is subject to very little scaling. The hydrogen gas can be supplied to the hand tool 1 with only a relatively small amount of pressure in excess of atmospheric pressure. Experience has shown that in this case there will be provided at a distance on the order of a few millimeters ahead of the open end of the bore 15 a sufficiently hot gas stream to carry out the soldering operations in faultless manner. As the distance of the stream from the tool increases the temperature of the stream rapidly falls off in the area into which the stream spreads, because the hydrogen gas stream very quickly spreads out in all directions and becomes mixed with the surrounding air. The advantage of this phenomenon is that in the region of the soldering area, temperature-sensitive elements are not injured in any way by the hot hydrogen gas stream. At the soldering area itself however the hydrogen gas stream serves not only to provide heat but also as a protective gas shutting out the atmospheric air from the soldering area itself.

The heating means 2 described above can be sealed in a fully reliable manner so that there is no mixture of oxygen and hydrogen in the tool. It has proved to be particularly suitable to adjust the operation of the tool and the pressure of the hydrogen gas issuing from the tool in such a way that at a distance of 4 mm. in front of the open end of the bore 15, which is to say in front of the discharge nozzle of the tool, the tool provides the desired hydrogen gas temperature for the purpose of carrying out the soldering operation. In contrast with electrically heated metallic soldering irons, the structure of the invention is capable of maintaining the soldering area supplied with a heat-conducting fluid, namely the hot hydrogen gas, which is reliably maintained at a constant temperature, independently of the factor of how much soldering takes place in a given unit of time. At the same time the process of the invention and the tool 1 enable the operations to be carried out in such a way that a cold protective gas which is directed to the working area, namely the cold hydrogen gas which is directed to the tool 1, can be very conveniently and quickly applied to the soldering area, even if the latter is highly inaccessible, in the form of a sharp heated gas stream of small cross sectional area, which is to say of pencil-shaped configuration.

Of course, the process and tool of the invention also can be used not only for soldering but also for tinning surfaces.

It will be understood that each of the elements described above, or two or more together, may also find a useful application in other types of soldering process and apparatus differing from the types described above.

While the invention has been illustrated and described as embodied in a soldering tool, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characeristics of the generic or specific aspects of this invention and, therefore, such adaptations should and are intended to be comprehended within the meaning and range of equivalence of the following claims.

What is claimed as new and desired to be secured by Letters Patent is:

1. A hand tool comprising an elongated metal core formed with a pair of substantially axial bores extending inwardly from opposed ends of said core and terminating respectively in inner bore ends distant from said ends of said core, said core being formed with a pair of transverse bores extending transversely through said core and communicating with said inner bore ends, respectively, and said core having an elongated threaded exterior surface extending between and terminating at outer open ends of said transverse bores; an elongated sleeve surrounding and engaging said core at its portion which extends between said transverse bores so that said sleeve defines with said threaded portion of said bore an elongated helical passage, said transverse bores communicating substantially with the ends of said passage, respectively, and said sleeve having end portions projecting beyond said transverse bores toward said ends of said core and fluid-tightly engaging the exterior surface thereof; an elongated tubular housing surrounding and spaced from said sleeve, said housing having end walls respectively formed with aligned bores through which said core projects so that the ends of said core are located outside of and beyond said end walls of said housing, one of the projecting ends of said core forming a discharge nozzle; a hollow hand grip connected to and projecting from said housing and having distant from said housing a portion carrying means for placing the interior of said hollow hand grip in communication with a source of a gas which is to be heated; a tube communicating at one end with the interior of said grip adjacent to said housing and at its other end with the other of said axial bores so that gas introduced into said grip will flow through said tube and along said bores and helical passage to discharge from said nozzle; and heating means in said housing in the space between the latter and said sleeve for heating gas flowing along said helical passage.

2. A tool as recited in claim 1 and wherein a plastic covering of low thermal conductivity surrounds and engages the exterior surface of said grip and has next to said housing a relatively flat projecting portion extending away from said grip beneath said housing to form a heat shield for said grip.

3. A tool as recited in claim 1 and wherein said core is made of copper.

4. A tool as recited in claim 1 and wherein said heating means includes elongated electrically conductive heating coils in said housing distributed about and extending longitudinally of said sleeve.

References Cited

UNITED STATES PATENTS

| | | | |
|---|---|---|---|
| 755,320 | 3/1904 | Seelye | 219—380 |
| 798,300 | 8/1905 | Sager | 219—305 X |
| 922,333 | 5/1909 | Rawson | 219—305 |
| 1,355,838 | 10/1920 | McLean | 219—305 X |
| 1,839,119 | 12/1931 | Potter | 219—381 |
| 1,949,658 | 3/1934 | Remseth et al. | 219—380 |
| 2,097,582 | 11/1937 | Beyrodt | 219—305 X |
| 2,220,545 | 5/1940 | Reinhardt. | |
| 2,556,609 | 6/1951 | Arkless | 219—227 |
| 2,730,609 | 1/1956 | Constantinesco | 219—381 |
| 2,775,683 | 12/1956 | Kleist | 219—305 X |
| 2,859,327 | 11/1958 | Kaminsky | 219—375 X |
| 2,976,392 | 3/1961 | Wabnitz | 219—380 |

FOREIGN PATENTS

| | | |
|---|---|---|
| 775,528 | 5/1957 | Great Britain. |

ANTHONY BARTIS, *Primary Examiner.*